(12) United States Patent
Berger et al.

(10) Patent No.: US 10,514,094 B2
(45) Date of Patent: Dec. 24, 2019

(54) METHOD FOR CONTROLLING THE INTERNAL ELECTRONIC RANGE SELECTION FOR A 9 SPEED AUTOMATIC TRANSMISSION

(71) Applicant: GM Global Technology Operations LLC, Detroit, MI (US)

(72) Inventors: Todd R. Berger, Pinckney, MI (US); David C. Webert, Livonia, MI (US); Roberto Diaz, Novi, MI (US); David H. Moiseev, Huntington Woods, MI (US); Joseph V. Pittiglio, Ortonville, MI (US); Dustin A. Nygaard, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 245 days.

(21) Appl. No.: 15/648,866

(22) Filed: Jul. 13, 2017

(65) Prior Publication Data

US 2019/0017592 A1    Jan. 17, 2019

(51) Int. Cl.
| | |
|---|---|
| *F16H 61/12* | (2010.01) |
| *F16H 61/30* | (2006.01) |
| *F16H 63/34* | (2006.01) |
| *F16H 63/48* | (2006.01) |
| *F16H 59/08* | (2006.01) |

(52) U.S. Cl.
CPC ............ *F16H 61/12* (2013.01); *F16H 61/30* (2013.01); *F16H 63/3483* (2013.01); *F16H 63/48* (2013.01); *F16H 59/08* (2013.01); *F16H 2061/1208* (2013.01); *F16H 2061/1264* (2013.01); *F16H 2061/1288* (2013.01); *F16H 2300/18* (2013.01)

(58) Field of Classification Search
CPC .. F16H 59/08; F16H 61/12; F16H 2061/1224; F16H 2061/1232; F16H 2061/1244; F16H 2061/1248; F16H 2061/1264; F16H 2061/1288
See application file for complete search history.

(56) References Cited

U.S. PATENT DOCUMENTS

| | | | |
|---|---|---|---|
| 6,880,419 B2 | 4/2005 | Berger et al. | |
| 2011/0028270 A1* | 2/2011 | Long | F16H 61/0206 477/62 |
| 2013/0319155 A1* | 12/2013 | Berger | F16H 59/08 74/473.11 |
| 2016/0053887 A1* | 2/2016 | Moorman | F16H 59/44 701/62 |

* cited by examiner

*Primary Examiner* — Edwin A Young

(57) ABSTRACT

A method for controlling internal electronic range selection for an automatic transmission includes: confirming if a range change command has been ordered from a current transmission operating state; verifying expected performance from at least first and second mode valves and a park servo are present in the current transmission operating state prior to allowing a range change event; during the range change event: generating proactive commands including ordering a reduction in a hydraulic system pressure; and identifying if an unexpected event is detected; and following completion of the range change event confirming expected performance is obtained from at least the first and second mode valves and the park servo to achieve a driver intended state.

20 Claims, 4 Drawing Sheets

METHOD FOR CONTROLLING THE INTERNAL ELECTRONIC RANGE SELECTION FOR A 9 SPEED AUTOMATIC TRANSMISSION

The present disclosure relates to automobile vehicle automatic transmission control systems.

Motorized vehicles include a power plant (e.g., an engine or an electric motor) that produces driving power. The driving power is transferred through a transmission to a driveline for driving a set of wheels at selected gear ratios. Typically, a desired transmission operating mode or range is selected by the vehicle operator. The ranges provided by most automatic transmissions generally include park, neutral, reverse and drive. Thereafter, as is well known, automatic transmissions shift automatically to an appropriate gear ratio based on various vehicle operating conditions including speed and torque. In drive, the automatic transmission automatically may shift between three, four, five, and up to nine different forward gear ratios based on the vehicle operating conditions.

Traditionally, a driver interface device is provided which the vehicle operator shifts to select the desired transmission range. The driver interface device is linked to the automatic transmission by a range shift mechanism which typically includes a series of interconnected mechanical devices such as levers, push/pull rods, cables and the like. The number and size of such mechanical components make it difficult to package the range shift mechanism between the driver interface device and the transmission and can add significant frictional resistance to the overall system. As a result, the overall cost for design, manufacture and assembly of the vehicle is increased.

In an attempt to address such issues related to mechanically-shifted transmission range shift mechanisms, several "shift-by-wire" range shift mechanisms have been developed. Typically, a shift-by-wire range shift mechanism is based on an external system having an electric motor for controlling movement of the transmission's manual shaft to the desired range select position. Switches associated with the driver interface device send a mode signal to a transmission controller that is indicative of the selected transmission range. Thereafter, the controller actuates the electric motor to move the transmission manual shaft to the corresponding range select position. Drawbacks of conventional shift-by-wire systems include undesirable failure modes associated with such a device and diagnostics that presently monitor and verify only that an expected performance is achieved from the components in a current operating state and that the expected performance of the components is achieved in a final operating state. A component failure such as a stuck hydraulic valve or a failure in achieving the expected performance at the current operating state or at the final operating state presently results in a clutch depressurization shutdown of the transmission and therefore a "walk home" state of the vehicle.

Thus, while current automatic transmission electronic range selection and shift-by-wire systems achieve their intended purpose, there is a need for a new and improved system and method for controlling internal electronic range selection of an automatic transmission.

SUMMARY

According to several aspects, a method for controlling internal electronic range selection for an automatic transmission includes: confirming if a range change command has been ordered from a current operating state; verifying expected performance from multiple monitored system components is present in the current operating state prior to allowing a range change event; during the range change event: generating proactive commands; and identifying if an unexpected event is detected; and following completion of the range change event confirming expected performance is obtained from all of the monitored system components.

In another aspect of the present disclosure, the method further includes completing the range change event during the generating proactive commands step if no errors from the monitored system components are detected and no unexpected event is detected.

In another aspect of the present disclosure, the method further includes modifying the proactive commands during the generating proactive commands step if any undetected single element failure occurs such that a vehicle driver is not placed in a hazardous state either during or at the completion of the range change event.

In another aspect of the present disclosure, the method further includes during the identifying step if an unexpected event is detected the proactive commands are modified to achieve a driver intended state if achievable.

In another aspect of the present disclosure, the method further includes during the identifying step if the driver intended state is not achievable the proactive commands are modified to place the vehicle in a safe state.

In another aspect of the present disclosure, the method further includes following an indication of any one or more undetected single element failures of the multiple monitored components all single element failures are considered for their effect during the range change event.

In another aspect of the present disclosure, the method further includes directing the proactive commands to avoid any non-safe states during all state conditions.

In another aspect of the present disclosure, the step of verifying expected performance from multiple monitored system components includes monitoring if each of a first mode valve has stroked and a second mode valve has stroked.

In another aspect of the present disclosure, step of verifying expected performance from multiple monitored system components includes monitoring if a park servo has stroked, the park servo actuating a park pawl engagement member.

In another aspect of the present disclosure, the method further includes generating a safe drive verified state signal; and generating a start range change phase signal.

According to several aspects, a method for controlling internal electronic range selection for an automatic transmission includes: confirming if a range change command has been ordered from a current transmission operating state; verifying expected performance from at least first and second mode valves and a park servo are present in the current transmission operating state prior to allowing a range change event; during the range change event: generating proactive commands including ordering a reduction in a hydraulic system pressure; and identifying if an unexpected event is detected; and following completion of the range change event confirming expected performance is obtained from at least the first and second mode valves and the park servo to achieve a driver intended state.

In another aspect of the present disclosure, the method further includes during the identifying step if a driver intended state is not achievable the proactive commands are modified to place the vehicle in a safe state.

In another aspect of the present disclosure, the method further includes if the vehicle is in a Park state the only safe state is to remain in the Park state.

In another aspect of the present disclosure, the method further includes if the vehicle is in a Neutral state the safe state is one of the Neutral state or a Park state.

In another aspect of the present disclosure, the method further includes if the vehicle is in a Drive state the safe state is one of a Park state, a neutral state, or to remain in the Drive state.

In another aspect of the present disclosure, the step of generating proactive commands includes reducing the hydraulic system pressure to approximately 200 kPa.

In another aspect of the present disclosure, the step of generating proactive commands includes reducing the hydraulic system pressure to below a maximum system pressure.

According to several aspects, a method for controlling internal electronic range selection for an automatic transmission includes: confirming if a range change command has been ordered from a current transmission operating state; monitoring in parallel multiple system components including at least first and second mode valves and a park servo; and providing four-layers of proactive safety software for operation and feedback of an electronic range selection (ETRS) system, including: in a first layer, verifying the at least first and second mode valves and the park servo are stroked in the current transmission operating state prior to allowing a range change event; in a second layer and during the range change event generating proactive commands including temporarily ordering a reduction in a hydraulic system pressure to approximately 200 kPa; in a third layer, identifying if an unexpected event including a failure of any one of the at least first and second mode valves and the park servo to be stroked is detected; and in a fourth layer, following completion of the range change event confirming expected performance is obtained from all of the multiple system components.

In another aspect of the present disclosure, the expected performance includes a clutch configuration defining a driver intended state.

In another aspect of the present disclosure, the method further includes generating a Not Safe Condition state signal if a park signal is generated, OR if a switch signal from a first mode valve position switch indicates the first mode valve has not been stroked, OR a switch signal from a second mode valve position switch indicates the second mode valve has not been stroked.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
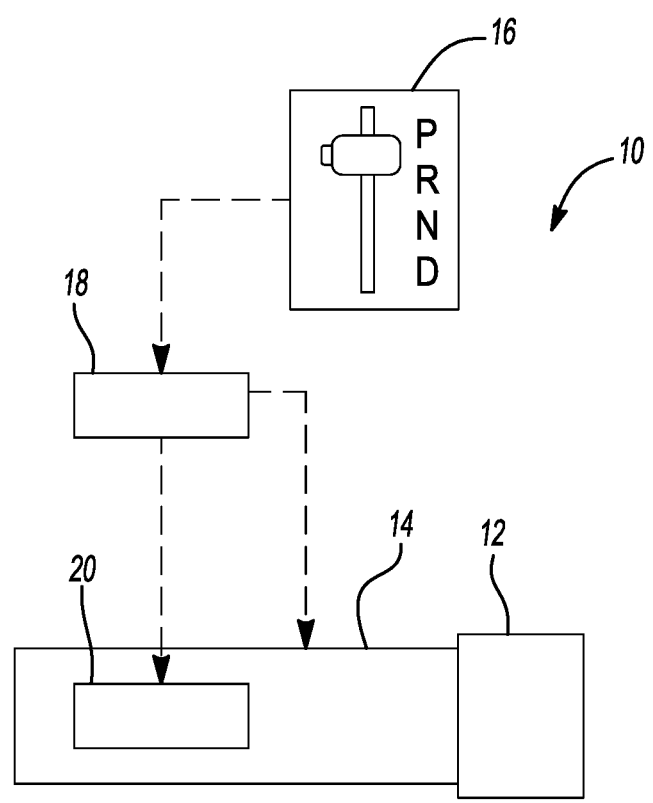
FIG. 1 is a schematic illustration of a vehicle system incorporating a transmission electronic range selection (ETRS) system according to the principles of the present disclosure.

Referring to FIG. 1, a schematic illustration of a vehicle 10 is presented. The vehicle 10 includes an engine 12 and an automatic transmission 14. The engine 12 produces driving torque that is transferred through the transmission 14 at varying gear ratios to drive at least one pair of wheels (not shown). A driver interface device 16 enables a vehicle operator to select various transmission range positions. The driver interface device 16 can include a lever, switches, dials, push-buttons or any other type of input interface desired. The normal transmission range positions, including Park, Reverse, Neutral, and Drive (PRND) are selectable, as well as manual downshifts and tap-up, tap-down capabilities via actuation of the driver interface device 16. In operation, the driver interface device 16 sends an electric mode signal to a controller 18 based on the selected transmission range.

The controller 18 signals a transmission electronic range selection (ETRS) system 20 to shift the transmission 14 to the corresponding range in response to the electric mode signal. The ETRS system 20 is an integral part of the transmission 14 and is operable to manipulate the flow of pressurized fluid to shift the transmission 14 between its available transmission ranges.

Referring to FIG. 2 and again to FIG. 1, a portion of a hydraulic control system 22 is presented which is in communication with the ETRS system 20 and provides feedback via multiple switches which will be described in greater detail herein. The hydraulic control system 22 includes multiple mode valves including a first mode valve 24 and a second mode valve 26. A mode enable valve 28 is in communication with the first mode valve 24 and the second mode valve 26. A park servo 30 is also in communication with the first mode valve 24 and the second mode valve 26. The park servo actuates a park pawl engagement member 32. A park solenoid 40 prevents shifting from an Out-of-Park mode into the Park mode in the event of a loss of pressurized fluid under specific circumstances. Multiple position switches provide position feedback of each of the mode valves and the park servo. These include a first mode valve position switch 34 signaling a position of the first mode valve 24 such as normal or stroked, a second mode valve position switch 36 signaling a position of the second mode valve 26, and a park servo position switch 38 signaling an engaged or disengaged position of the park pawl engagement member 32 prior to and following operation of the park servo 30.

Figure 2:
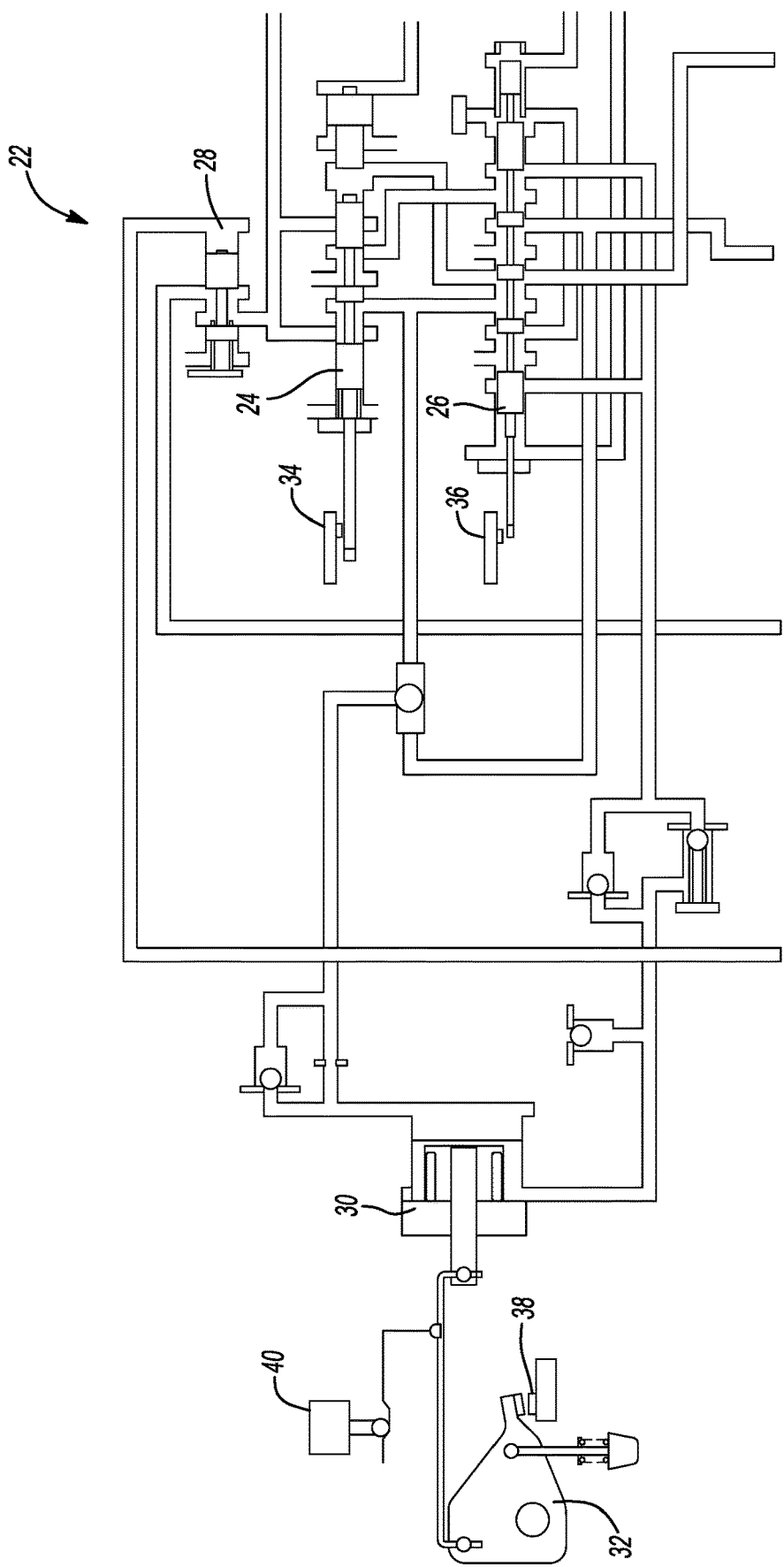
FIG. 2 is a schematic illustration of a portion of a hydraulic control system according to an exemplary embodiment.
Figure 3:
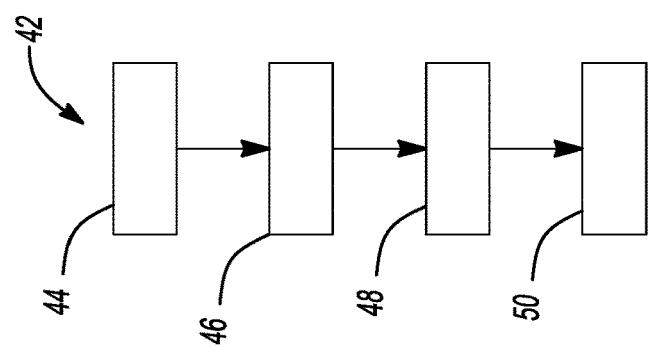
FIG. 3 is a flow diagram of four level layer proactive safety software applied for operation and feedback of the ETRS system according to an exemplary embodiment.

Referring to FIG. 3 and again to FIGS. 1 and 2, a flow diagram 42 identifies four levels or layers of proactive safety software are applied for operation and feedback of the ETRS system 20. In a first layer 44, expected performance from all monitored components in their current operating state is verified prior to implementation of any driver initiated command such as a range change command to change from Park to Drive, from Drive to Neutral, from Reverse to Park, and the like.

In a second layer 46, during a range change event, all actions are proactively commanded such that: 1) in the event that no errors from the monitored system components are detected, the range change is completed in a smooth and efficient manner; and 2) in the event that any undetected single element failure occurs, the driver will not be placed in a hazardous state either during or at the completion of the range change. Following an undetected single element failure all single element failures are considered for their effect during the range change, and commands are directed such that all hazard states are avoided during all conditions. According to several aspects, an undetected single element failure may for example be a stuck hydraulic valve occurring during operation such as in Drive mode which does not impact continued operation, and the failure of which will not be identified until the next range change is selected. The impact of the single element failure is assessed before a next range change is permitted.

In a third layer 48, if an unexpected event such as a single element failure is detected during the range change: 1) when possible, commands are modified to achieve the driver intended state; or 2) if the response to (1) above is not possible, the commands are modified to place the driver and vehicle in a "safe state" defined below. For each of the above conditions (1) and (2), following an undetected single element failure all single element failures are considered for their effect during the range change, and commands are directed such that all hazard states are avoided during all conditions.

According to several aspects the safe state is defined as a state that will not startle the driver by producing an unexpected condition, and is identified using the following examples, which are not exhaustive. If the vehicle is presently in Park mode and an error indication is identified during system monitoring the only safe state is to remain in Park mode. If the vehicle is presently in Neutral mode and an error indication is identified the safe state is to remain in Neutral mode or shift to Park mode. If the vehicle is presently in Neutral mode and an error indication is identified as the driver elects to change to Drive mode, the safe state is to remain in the Neutral mode, shift to Park mode, or to shift to the desired Drive mode if possible. If the vehicle is presently in Park mode and an error indication is identified as the driver elects to change to Reverse mode, the safe state is to remain in Park mode, shift to Neutral mode, or allow the shift to Reverse mode if possible. If the vehicle is presently in Drive mode and an error indication is identified as the driver elects to change to a different mode, the safe state is to either remain in Drive mode or if possible to shift to Park or Neutral mode.

In a fourth layer 50, expected performance is verified from all monitored components in the final operating state. For example if Drive mode is selected the expected performance of all monitored components such as the mode valves 24, 26, the park servo 30, the clutch position switches, engine speed sensors, turbine speed sensors, a clutch configuration defining a driver intended state, and the like are verified to correspond to predetermined conditions expected when in Drive mode.

Figure 4:
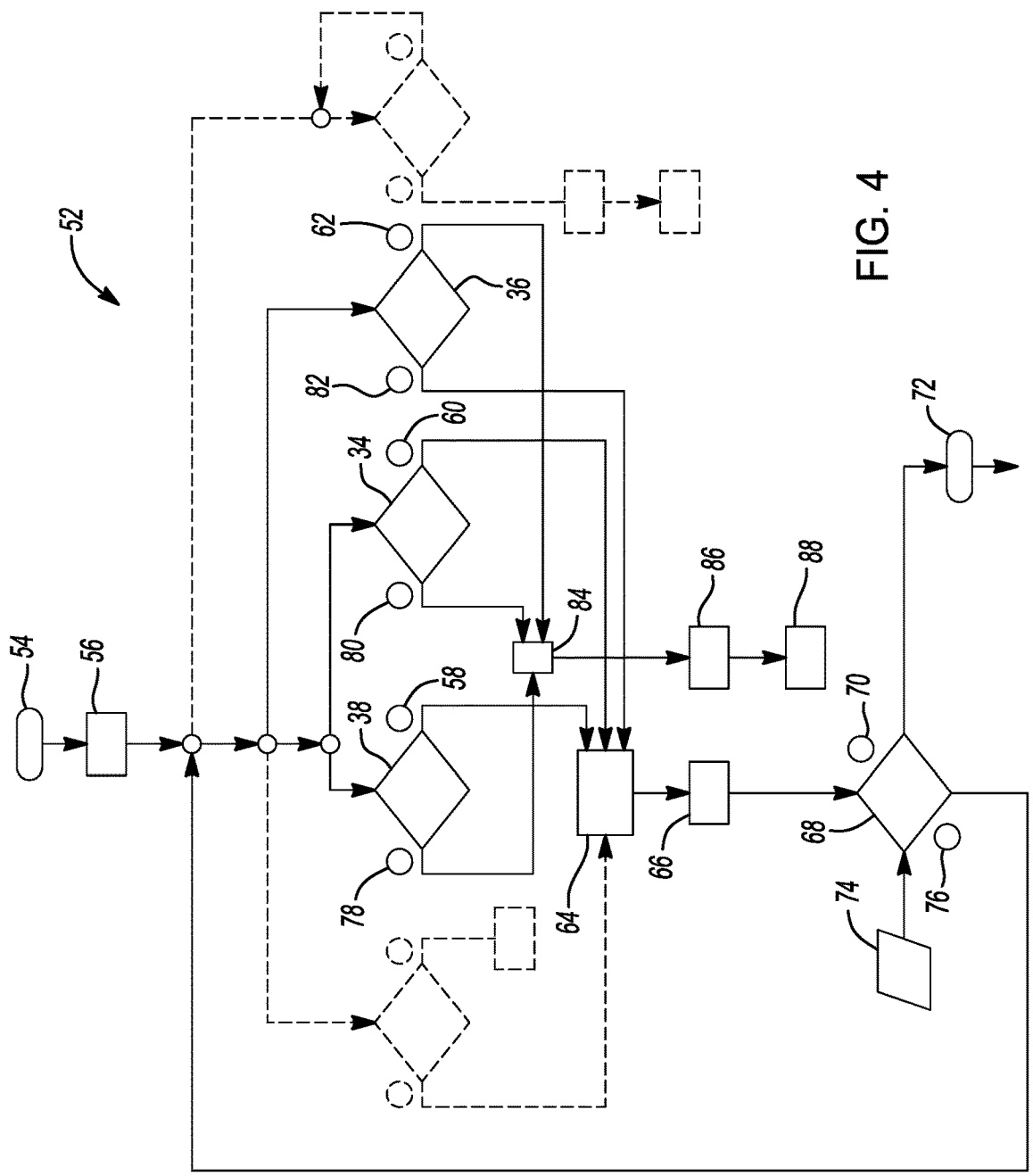
FIG. 4 is a schematic illustration of an exemplary parallel sensing portion of the ETRS system for determining if a start range change phase signal is generated.

Referring to FIG. 4, a schematic 52 presents the monitoring features of the vehicle ETRS system 20 during an exemplary range change from a Neutral mode to Drive mode. Multiple similar schematics are also available for any of the other possible range changes. In the present example, the states of each of the park servo position switch 38, the first mode valve position switch 34, and the second mode valve position switch 36, together with additional detection items are monitored in parallel. Initially at a first step 54 a determination is made if a drive engagement is ON. Following in a second step a test is conducted to determine if a safe drive condition is present. Multiple tests are then conducted in parallel. If a switch signal 58 from the park servo position switch 38 indicates the vehicle is not in Park, a switch signal 60 from the first mode valve position switch 34 indicates the first mode valve has stroked, and a switch signal 62 from the second mode valve position switch 36 indicates the second mode valve has stroked, all such signals forwarded via an AND gate 64 to produce a Safe Drive Verified state signal 66. If the Safe Drive Verified state signal 66 is present, in a range change step 68 a query is made whether a Range change has been commanded. If a positive response 70 is generated from the range change step 68, a start range change phase signal 72 is generated. The range change step 68 also requires input from a range selector input 74.

The start range change phase signal 72 is NOT generated under the following conditions. If a signal from the park servo position switch 38 indicates the vehicle is NOT in Park, a park signal 78 is generated. If any of the park signal 78 is generated, OR if a switch signal 80 from the first mode valve position switch 34 indicates the first mode valve has not been stroked, OR a switch signal 82 from the second mode valve position switch 36 indicates the second mode valve has not been stroked and passed via an OR gate 84 a Not Safe Condition state signal 86 is generated. The Not Safe Condition state signal 86 passes to a command signal generator 88, which commands a change to zero kPa line pressure in the hydraulic system, and further commands engagement of electrically operated service brakes to preclude further vehicle motion.

Figure 5:
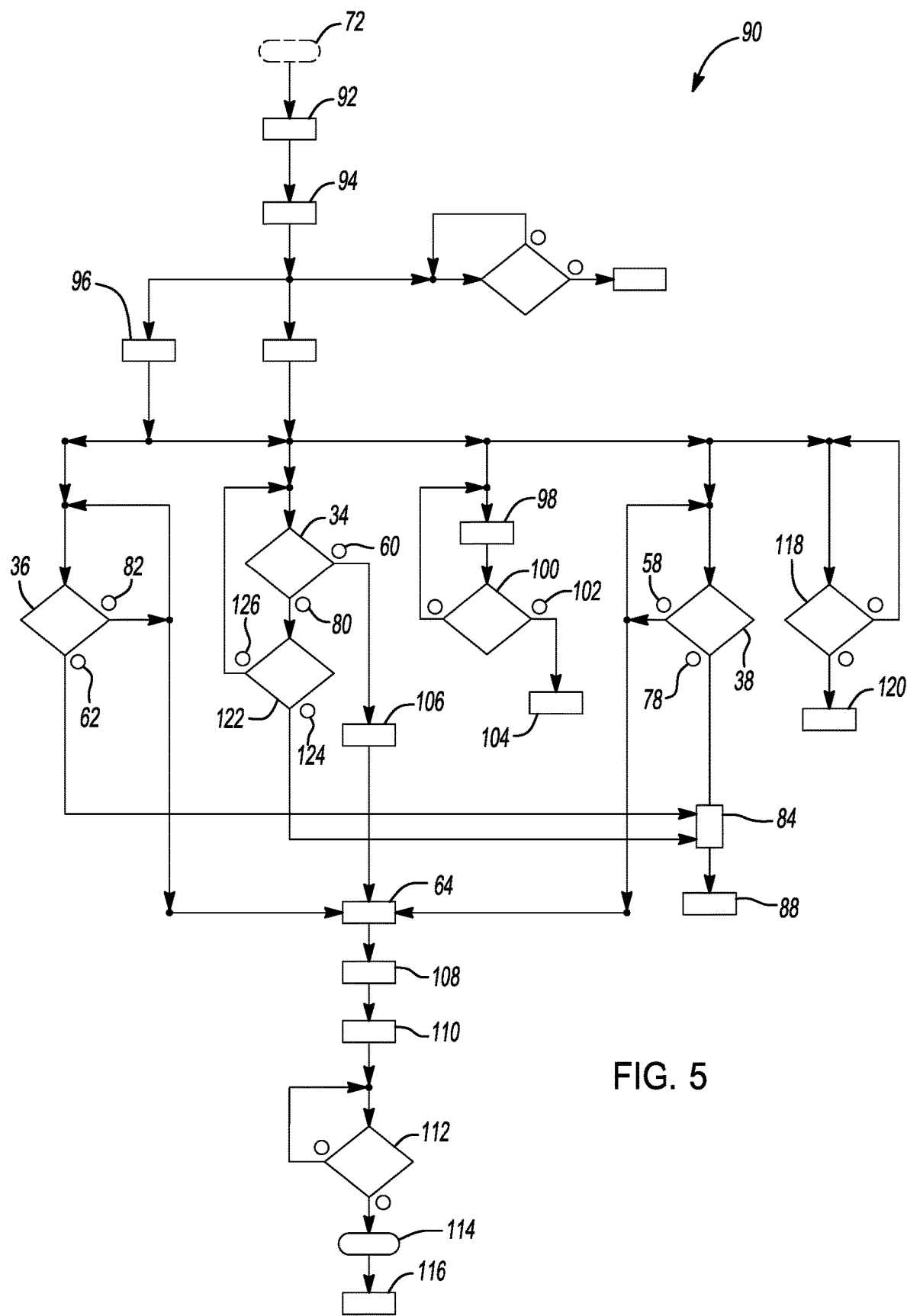
FIG. 5 is a schematic illustration of an exemplary parallel sensing portion of the ETRS system following generation of the start range change phase signal of FIG. 4.

Referring to FIG. 5 and again to FIGS. 2 and 4, after the start range change phase signal 72 is generated a command 92 is issued to maintain Pisa pressure. To ensure the mode enable valve 28 is activated a command 94 is sent to set hydraulic line pressure to a low limit so the Pisa is not overridden. A command 96 is then sent to set clutch pressure to a predetermined calibrated pressure. Similar to the discussion of FIG. 4, the states of each of the park servo position switch 38, the first mode valve position switch 34, and the second mode valve position switch 36, together with additional detection items continue to be monitored in parallel.

If during the following parallel state condition checks. During the parallel checks of the first mode valve position switch 34, the second mode valve position switch 36, and the park servo position switch 38, in a step 98 a remaining on-coming clutch volume is calculated, and in a following step 100 it is determined if the remaining on-coming clutch volume is less than a predetermined value. If it is confirmed that the remaining on-coming clutch volume is less than the predetermined value as determined in a step 102, at a step 104 a command is generated to set the on-coming clutch pressure to 200 kPa. Following receipt of the switch signal 58 from the park servo position switch 38 indicating the vehicle is not in Park, and the switch signal 82 from the second mode valve position switch 36 indicating the second mode valve has stroked, if the switch signal 60 from the first mode valve position switch 34 also indicates the first mode valve 24 has stroked a command 106 is then sent to reduce clutch pressure to zero kPa and all signals are sent via the AND gate 64.

At this time in a step 108 a high limit on hydraulic system pressure is removed, in a step 110 a garage shift pressure is commanded, and a turbine torque factor is applied in a step 112. The range change phase then ends at step 114, and a follow-up test is conducted to determine if a safe drive condition is present at a step 116.

To provide a time limit for the range change phase, in a step 118 if a time to make the range change is greater than a predetermined calibration time, in a step 120 a command is sent to set the hydraulic system line pressure to zero kPa and a diagnostic check is conducted. As a further time limit if the switch signal 80 from the first mode valve position switch 34 indicates the first mode valve 24 has not been stroked and in a step 122 a range change timer value is greater than a predetermined time, the command signal generator 88 commands the change to zero kPa line pressure in the hydraulic system, and further commands engagement of electrically operated service brakes to preclude further vehicle motion. In a step 124 if the range change timer value is not greater than the predetermined time the first mode valve position switch 34 stroke position is reexamined.

A method for controlling internal electronic range selection for an automatic transmission of the present disclosure offers several advantages. These include providing drive and reverse selection along with two independent methods to achieve Neutral, and three independent methods to achieve Park. This method also provides range selection with both a running engine and when originating from an auto-stop condition. By continuously monitoring the mode valve position switches and the park position switch the present method enables a four layer proactive safety strategy to provide a high degree of safety. The present method further allows operation of a drive-default system while still allowing quick and accurate changes out of drive into other ranges.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for controlling internal electronic range selection for an automatic transmission, comprising:
    confirming if a range change command has been ordered from a current operating state;
    verifying expected performance from multiple monitored system components is present in the current operating state prior to allowing a range change event;
    during the range change event:
        generating proactive commands including identifying if errors from the monitored system components are detected during the range change event; and
        identifying if an unexpected event is detected; and
    following completion of the range change event confirming expected performance is obtained from all of the monitored system components.

2. The method for controlling internal electronic range selection for an automatic transmission of claim 1, further including completing the range change event during the generating proactive commands step if no errors from the monitored system components are detected and no unexpected event is detected.

3. The method for controlling internal electronic range selection for an automatic transmission of claim 1, further including modifying the proactive commands during the generating proactive commands step if any undetected single element failure occurs such that a vehicle driver is not placed in a hazardous state including a stuck hydraulic valve either during or at the completion of the range change event.

4. The method for controlling internal electronic range selection for an automatic transmission of claim 1, wherein during the identifying step if an unexpected event is detected the proactive commands are modified to achieve a driver intended state if achievable.

5. The method for controlling internal electronic range selection for an automatic transmission of claim 4, wherein during the identifying step if the driver intended state is not achievable the proactive commands are modified to place a vehicle in a safe state defining when a driver is not startled by production of a driver unexpected condition.

6. The method for controlling internal electronic range selection for an automatic transmission of claim 1, further including following an indication of any one or more undetected single element failures of the multiple monitored components all single element failures are considered for their effect during the range change event.

7. The method for controlling internal electronic range selection for an automatic transmission of claim 6, further including directing the proactive commands to avoid any non-safe states during all state conditions including allowing a shift out of a park mode if in the park mode.

8. The method for controlling internal electronic range selection for an automatic transmission of claim 1, wherein the step of verifying expected performance from multiple monitored system components includes monitoring if each of a first mode valve has fully stroked and a second mode valve has fully stroked.

9. The method for controlling internal electronic range selection for an automatic transmission of claim 8, wherein the step of verifying expected performance from multiple monitored system components includes monitoring if a park servo has fully stroked, the park servo actuating a park pawl engagement member.

10. The method for controlling internal electronic range selection for an automatic transmission of claim 9, further including:
    generating a safe drive verified state signal; and
    generating a start range change phase signal.

11. A method for controlling internal electronic range selection for an automatic transmission, comprising:
    confirming if a range change command has been ordered from a current transmission operating state;
    verifying expected performance from at least first and second mode valves and a park servo are present in the current transmission operating state prior to allowing a range change event;
    during the range change event:
        generating proactive commands including ordering a reduction in a hydraulic system pressure; and
        identifying if an unexpected event is detected; and
    following completion of the range change event confirming expected performance is obtained from at least the first and second mode valves and the park servo to achieve a driver intended state.

12. The method for controlling internal electronic range selection for an automatic transmission of claim 11, wherein during the identifying step if a driver intended state is not achievable the proactive commands are modified to place a vehicle in a safe state defining when a driver is not startled by production of a driver unexpected condition.

13. The method for controlling internal electronic range selection for an automatic transmission of claim 12, wherein if the vehicle is in a Park state the only safe state is to remain in the Park state.

14. The method for controlling internal electronic range selection for an automatic transmission of claim 12, wherein if the vehicle is in a Neutral state the safe state is one of the Neutral state or a Park state.

15. The method for controlling internal electronic range selection for an automatic transmission of claim 12, wherein if the vehicle is in a Drive state the safe state is one of a Park state, a neutral state, or to remain in the Drive state.

16. The method for controlling internal electronic range selection for an automatic transmission of claim 11, wherein the step of generating proactive commands includes reducing the hydraulic system pressure to approximately 200 kPa.

17. The method for controlling internal electronic range selection for an automatic transmission of claim 11, wherein the step of generating proactive commands includes reducing the hydraulic system pressure to below a maximum system pressure.

18. A method for controlling internal electronic range selection for an automatic transmission, comprising:
   confirming if a range change command has been ordered from a current transmission operating state;
   monitoring in parallel multiple system components including at least first and second mode valves and a park servo; and
   providing four-layers of proactive safety software for operation and feedback of an electronic range selection (ETRS) system, including:
   in a first layer, verifying the at least first and second mode valves and the park servo are fully stroked in the current transmission operating state prior to allowing a range change event;
   in a second layer and during the range change event generating proactive commands including temporarily ordering a reduction in a hydraulic system pressure to approximately 200 kPa;
   in a third layer, identifying if an unexpected event including a failure of any one of the at least first and second mode valves and the park servo to be fully stroked is detected; and
   in a fourth layer, following completion of the range change event confirming an expected performance is obtained from all of the multiple system components.

19. The method for controlling internal electronic range selection for an automatic transmission of claim 18, wherein the expected performance includes a clutch configuration defining a driver intended state.

20. The method for controlling internal electronic range selection for an automatic transmission of claim 18, further including generating a Not Safe Condition state signal if a park signal is generated, OR if a switch signal from a first mode valve position switch indicates the first mode valve has not been fully stroked, OR a switch signal from a second mode valve position switch indicates the second mode valve has not been fully stroked.

* * * * *